UNITED STATES PATENT OFFICE.

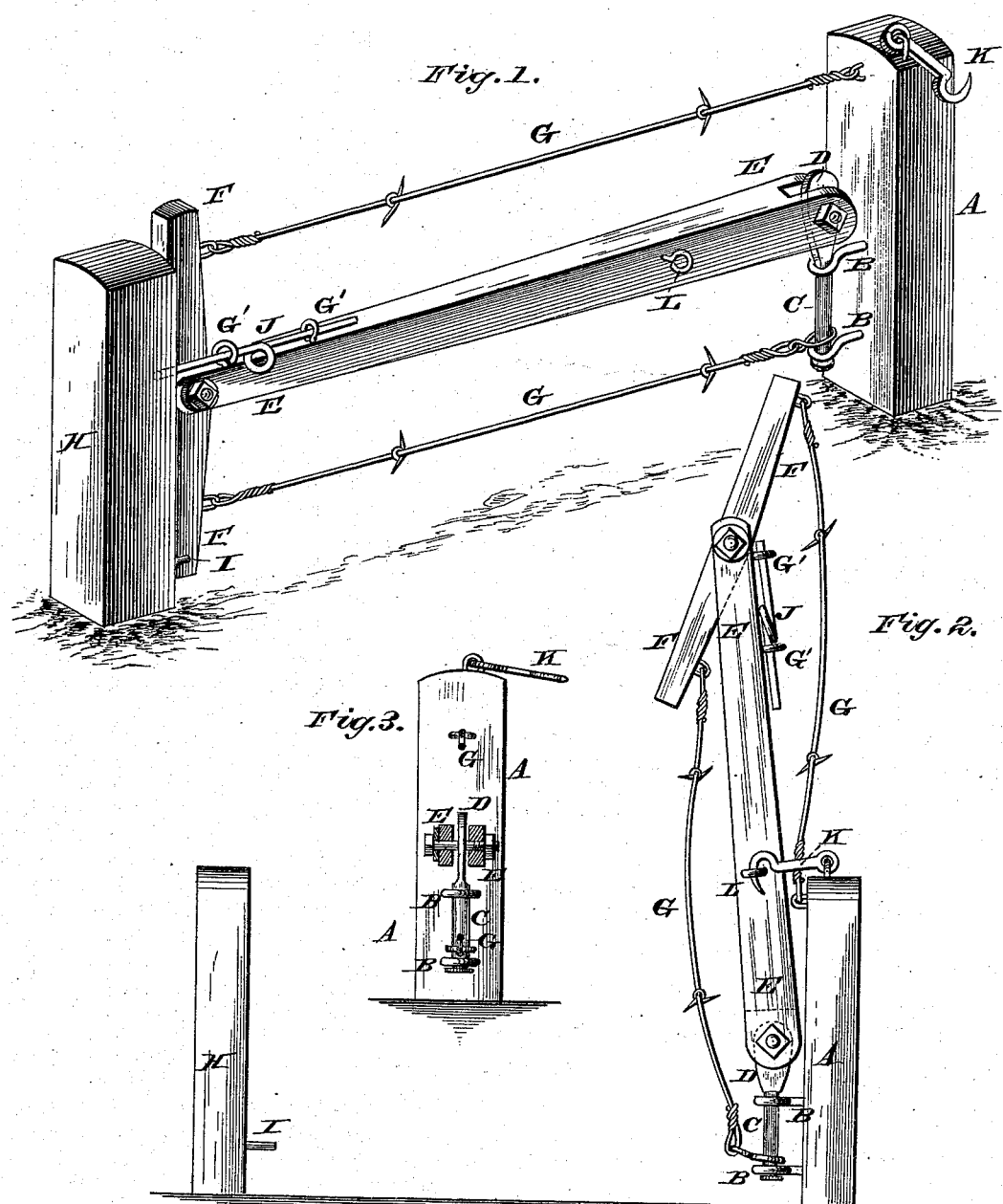

LEMUEL PATTERSON AND IRENAS J. PALMER, OF OLEAN, NEW YORK.

GATE.

SPECIFICATION forming part of Letters Patent No. 251,728, dated January 3, 1882.

Application filed October 29, 1881. (Model.)

*To all whom it may concern:*

Be it known that we, LEMUEL PATTERSON and IRENAS J. PALMER, of Olean, in the county of Cattaraugus and State of New York, have invented certain new and useful Improvements in Gates; and we do hereby declare that the following is a full, clear, and exact description of the invention, which will enable others skilled in the art to which it appertains to make and use the same, reference being had to the accompanying drawings, which form a part of this specification.

Figure 1 is a perspective view of our improved gate. Fig. 2 is a side view, showing the gate open; and Fig. 3 is a vertical sectional view.

Corresponding parts in the several figures are denoted by like letters of reference.

This invention relates to gates; and its object is to construct a gate the barriers of which may be of barbed or plain wires in such a manner that but two bars—a horizontal and a vertical—shall be embodied in its construction, and so that it may be opened either by raising or tilting it or by swinging it in a horizontal plane, or both, as will be hereinafter more fully described, and particularly pointed out in the claims.

In the drawings hereto annexed, A represents the gate-post, which is also a fence-post. Said post is provided with staples or eyebolts B B, in which is adjusted a rod or bolt, C, having a flattened head, D, and serving as a gate-hinge.

E is the horizontal or main gate-bar, which is pivoted to the upper flattened end of rod C, so as to be capable of swinging in a vertical as well as in a horizontal plane. F is a short vertical bar pivoted to the outer or free end of the gate-bar E.

G G are the wires, barbed or plain, which form the barriers of the gate, and of which any suitable number may be employed. Those above the bar E have their ends linked or otherwise connected to the bar F and post A, respectively, while of those below bar E one or more may have their inner ends connected to the hinge-rod C, all in such a manner as to be stretched taut when the gate is closed, as in Fig. 1 of the drawings.

The fence-post H, at the free or swinging end of the gate, is provided a short distance above the ground with pins or studs I I, between which the lower end of the vertical gate-bar F is adjusted when the gate is closed. To retain it in a closed position, the gate-bar E is provided with a bolt or latch, J, sliding in staples G' and engaging an opening or recess in the post H.

When the gate is tilted open, as in Fig. 2 of the drawings, it may be retained in such position by a hook, K, at the upper end of gate-post A engaging an eyebolt or staple, L, in the side of gate-bar E.

The operation of our improved gate will be readily understood from the foregoing description, taken in connection with the drawings hereto annexed. To open it the latch L is withdrawn and the bar F slightly raised so as to disengage it from the pins I, when the gate may swing open in either direction in a horizontal plane; or it may be raised or tilted, as shown in Fig. 2, to a nearly vertical position, in which it may be retained by the hook K. When thus raised or tilted it will be observed that the wires, owing to their inner ends being secured or made fast at points in rear of the axis upon which the gate swings, are somewhat slackened, thus avoiding unnecessary strain upon the said wires.

Our improved gate is simple, durable, easily operated, and may be put up at a trifling cost.

Having thus described our invention, we claim and desire to secure by Letters Patent of the United States—

1. The herein-described gate, embodying in its construction the longitudinal wire barriers G, the single horizontal swing-bar E, and the end bar, F, pivoted at its center to the free end of bar E, as described, for the purpose set forth.

2. The combination of the gate-post A, the hinge-bolt C, the horizontal bar E, pivoted to said hinge-bolt and having pivoted bar F, and the barrier-wires G, as described, for the purpose set forth.

3. The combination of the post A, the bar

E, pivoted to the hinge-bolt C and having centrally-pivoted bar F, the upper barrier-wire having its ends connected to the bar F and to the gate-post in rear of the axis upon which the gate turns, and the lower barrier-wire secured to the bar F and to the hinge-bolt C, so that said wire shall become slackened when the gate is tilted, as set forth.

In testimony that we claim the foregoing as our own we have hereto affixed our signatures in presence of two witnesses.

LEMUEL PATTERSON.
IRENAS JOHNSON PALMER.

Witnesses:
FRED BECHTLE,
RICHMOND C. HILL.